United States Patent Office 2,949,159
Patented Aug. 16, 1960

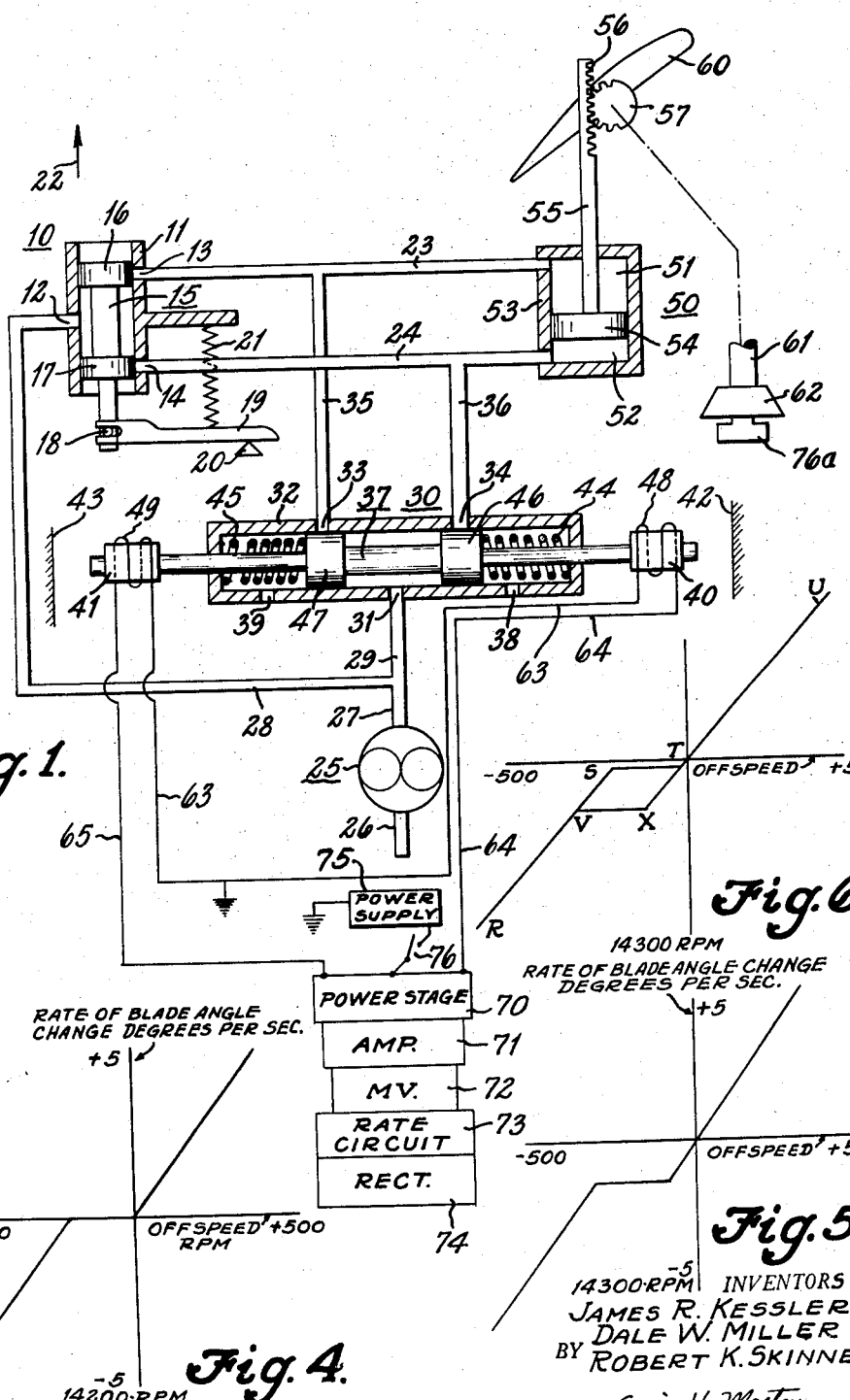

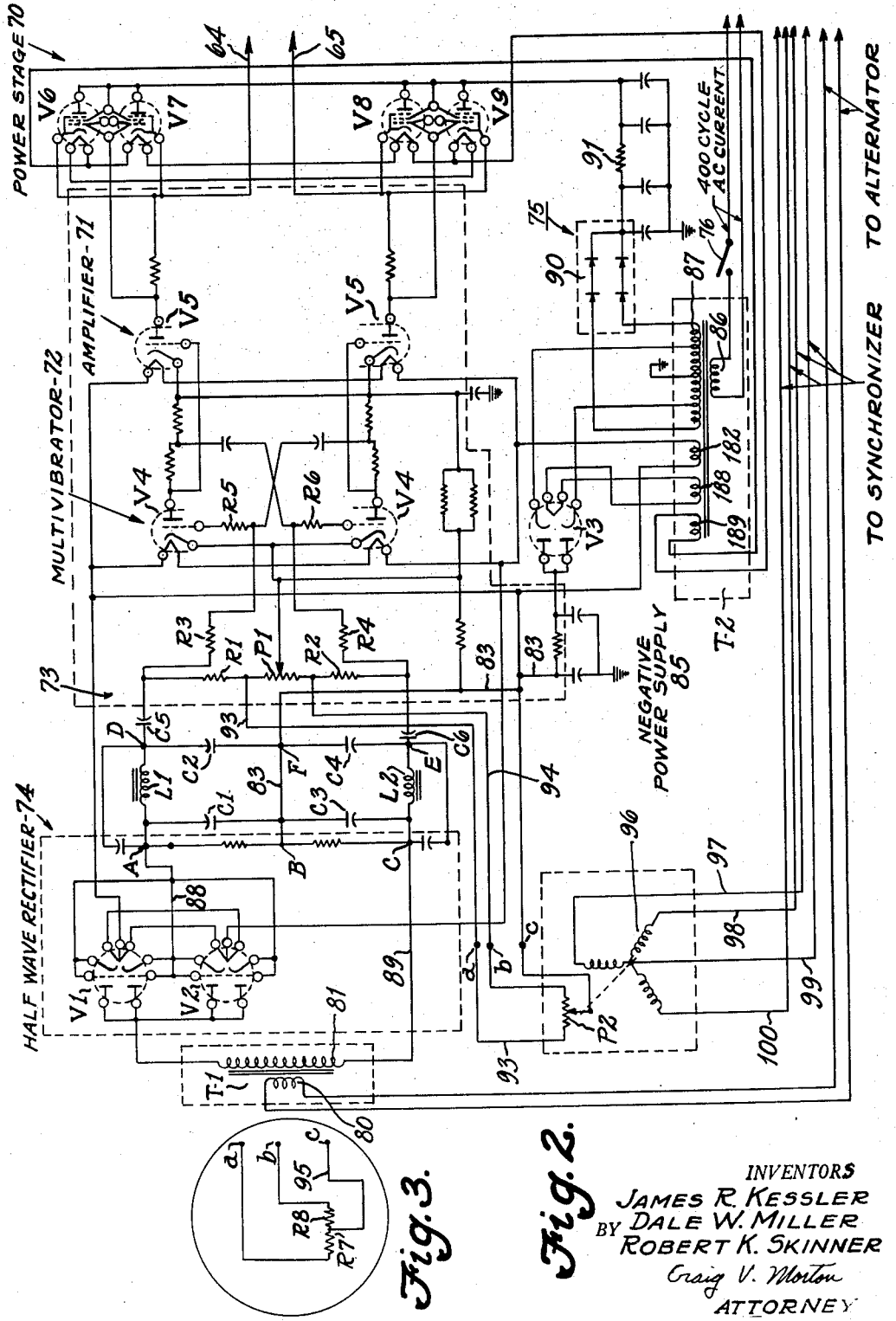

2,949,159
PROPELLER SPEED CONTROLLER

James R. Kessler, Troy, Dale W. Miller, Brookville, and Robert K. Skinner, Dayton, Ohio, assignors to General Motors Corporation, Detroit, Mich., a corporation of Delaware Filed Jan. 20, 1954, Ser. No. 405,154

19 Claims. (Cl. 170—160.14)

This invention pertains to a speed control system for prime movers, and particularly to speed control means for a variable pitch propeller-prime mover combination.

One of the more important criteria to be considered in the design of propeller speed control systems is the safety and reliability of operation. Heretofore, electronic speed control systems have been devised which, unfortunately, are subject to failure by reason of their complexity. This invention pertains to a speed control system embodying a fluid pressure governing system and an auxiliary electronic system, which is used to bias the speed control system to produce stabilized speed control. However, with the system of this invention, satisfactory performance can be obtained with only the fluid pressure governor, in case the electronic biasing system should fail. Accordingly, among our objects are the provision of a combined centrifugal and electronic speed governing system; the further provision of a governing system incorporating acceleration sensitive means; and the still further provision of a speed control system including means for effecting synchronous operation of a plurality of propeller-prime mover combinations.

The aforementioned and other objects are accomplished in the present invention by employing a centrifugally responsive valve for speed control, and an electronic system for acceleration and synchronization control. Specifically, the apparatus disclosed herein includes a centrifugally responsive governor valve mounted in a rotating field, and adjustable so as to maintain a substantially constant speed by controlling fluid flow to and from propeller pitch changing mechanism. The electronic biasing system may include only an acceleration sensitive circuit, or may include acceleration and synchronization sensitive circuits which are somewhat similar to those disclosed and claimed in copending application Serial No. 253,257, filed October 26, 1951, in the name of Albert P. Dinsmore, now Patent No. 2,754,921. The electronic system energizes a solenoid valve having parallel connections with the centrifugal valve and the pitch changing mechanism.

To achieve the desired electronic biasing, the solenoid valve is constructed so that unbalanced flows are produced even though the electronic system senses no acceleration deviations, or speed changes. This biasing action is provided to alter the pitch change rate sensitivity of the speed control system so as to improve the performance and stability of the speed control system. In so doing, the governed speed is automatically increased a predetermined amount. The biasing flow from the solenoid valve also dampens speed oscillations and thereby prevents undesirable "hunting" during speed correction.

Further objects and advantages of the present invention will be apparent from the following description, reference being had to the accompanying drawings wherein a preferred embodiment of the present invention is clearly shown.

In the drawings:

Fig. 1 is a combined schematic and blocked diagram illustrating a fluid pressure system for adjusting propeller pitch, and an electronic biasing system for modifying the operation of the fluid pressure system.

Fig. 2 is a detailed circuit diagram of the principal elements of the electronic control system.

Fig. 3 is a circuit diagram illustrating the manner in which the electronic circuit of Fig. 2 may be modified to remove synchronization control.

Fig. 4 is a graph of a control curve for the centrifugally responsive governor valve.

Fig. 5 is a graph of a control curve for the centrifugal governor valve as modified by electronic acceleration control.

Fig. 6 is a graph of the control curve of the centrifugal governor valve as modified by acceleration and synchronization control.

With particular reference to Fig. 1, the fluid pressure governing system will first be described. Basically, the fluid pressure governing system is similar to that disclosed in the Blanchard et al., Patents 2,307,101 and 2,307,102, in that the fluid pressure governing system includes a centrifugally responsive valve, which is mounted in and rotatable with a regulator assembly that is carried by the variable pitch propeller. Thus, as is shown in Fig. 1, the fluid pressure governing system includes a governor valve assembly 10, which comprises a housing 11 having a supply port 12 and a pair of control ports 13 and 14. The housing 11 provides a bore within which a plunger 15 is disposed for reciprocable movement. The plunger 15 includes a pair of spaced lands 16 and 17, which lands are separated by an annular channel having communication with the supply port 12. The lands 16 and 17 are of greater width than their respective ports 13 and 14, that is the lands have a positive overlapping relation which results in a flat, or no response range, as indicated by the horizontal part of the curves in Figures 4 through 6. The plunger 15 is also pivotally interconnected at 18 to a lever 19, the mechanical advantage of which may be varied by movement of a fulcrum point 20. The lever 19 and, hence, the plunger 15 are urged in a downward direction, as viewed in Fig. 1, by means of a compression spring 21, while the thrust of centrifugal force, as indicated by the arrow 22, opposes the action of the spring 21.

Structurally, the governor valve assembly 10 is mounted in a centrifugal field, and so disposed that the axis of the plunger 15 is disposed along a radius of the center of rotation thereof. This arrangement is similar to that disclosed in the aforementioned Blanchard patents. Thus, it will be appreciated that dependent upon the mechanical advantage of the lever 19, as determined by the position of fulcrum 20, at a certain rotative speed of the propeller, the plunger 15 will assume a neutral or equilibrium position wherein the opposing spring and centrifuugal forces are equal. Under these conditions, the plunger 15 will be positioned, as shown in Fig. 1, wherein the lands 16 and 17 cover the ports 13 and 14. However, if the rotative speed of the propeller should decrease from this selected or equivalent speed, it will be appreciated that the force of spring 21, will be effective to move the plunger 15 in a downward direction, as viewed in Fig. 1, so as to interconnect ports 12 and 14, while port 13 is connected to drain through one of the open ends of the housing 11. Conversely, should the angular velocity of the propeller increase above the selected, or equivalent speed, the thrust of centrifugal force will be greater than the spring force and, consequently, the valve plunger 15 will move upwardly, as viewed in Fig. 1, so as to interconnect ports 12 and 13, while port 14 is connected to drain.

The fluid pressure system includes a source of fluid pressure, which may conveniently take the form of a pump, as indicated by the numeral 25. The pump includes an inlet 26 through which fluid is drawn from a reservoir, not shown, and the pressure potential thereof is increased by the pump after which, the fluid is delivered to an outlet conduit 27. The outlet conduit 27 includes branches 28 and 29, branch 28 being connected to the supply port 12 of the centrifugal governor valve 10. Branch 29 is connected to the supply port 31 of a solenoid valve assembly 30, to be described. Port 13 of the governor valve 10 is connected by conduit 23 to the increase pitch chamber 51 of a fluid motor 50, while port 14 is connected by conduit 24 to the decrease pitch chamber 52 of the fluid motor 50. Structurally, the fluid motor 50 may take the form of a torque unit, as disclosed in the aforementioned Blanchard et al., patents. However, it is to be realized that the present invention is applicable to all fluid pressure controlled pitch changing mechanisms, and, consequently, the particular form of actuating mechanism forms no part of this invention. Schematically, the fluid motor 50 is shown as including cylinder 53 having disposed therein a reciprocable piston 54, which is capable of fluid pressure actuation in either direction. The piston 54 is shown having connection with a rod 55, which extends through an end wall of the cylinder and is formed with a rack portion 56 adjacent the free end thereof. The rack portion, in turn, engages a pinion gear 57, which is operatively connected to a propeller blade 60 so that upon reciprocal movement of the piston, the propeller blade 60 will be rotated about its longitudinal axis. In this manner the pitch position of the propeller blade may be adjusted. Propeller 60 is shown operatively connected to a shaft 61, which is driven by a prime mover 62, which may be a turbine. The turbine 62 also drives an alternator 76a.

With particular reference to Figs. 1 and 4, the operation of the fluid pressure governing system, per se, in controlling the angular velocity of the propeller having blade 60 and, hence, prime mover 62, will next be described. As those skilled in the are are cognizant of, the fluid pressure, or centrifugally responsive governor valve 10, has a certain pitch change rate, which is due to its physical construction. That is, a centrifugally responsive valve is operable to effect a predetermined rate of blade angle change per revolution per second propeller off-speed. For convenience, this rate of blade angle change, or capacity, of the centrifugally responsive valve 10 will hereinafter be designated by $K_1$, which is designated in degrees per second per R.P.S. off-speed. For the centrifugal valve 10, the pitch change rate will be in accordance with the characteristic curve shown in Fig. 4. From an inspection of Fig. 4, it is apparent that the $K_1$ rate of the centrifugal governor valve near the on-speed condition, as indicated by the intersection of the ordinate and abscissa is relatively low. The low $K_1$ rate near the on-speed condition is desirable since it tends to promote speed stability when only the centrifugal governor is functioning, as will be more particularly pointed out hereinafter.

The speed setting of the centrifugal responsive governor valve 10, as depicted in the graph of Figure 4, is 14,200 turbine r.p.m. The governor valve 10 operates at the right hand end of the no response range such that an increase in propeller speed above the speed setting of the governor will result in upward movement of the plunger so as to open port 13 to pressure and connect port 14 to drain. In this manner the pitch position of the propeller blades will be increased so as to bring propeller speed back to the speed setting of the governor. Moreover, the rate of pitch change is directly proportional to the amount of propeller overspeed as indicated by the control graph in Figure 4. On the other hand, should the propeller underspeed, the valve plunger 15 will move downwardly. However, since the graph of Figure 4 indicates there is a substantial no response range, port 14 will not be connected to pressure and port 13 will not be connected to drain until the propeller underspeed exceeds a predetermined amount, which is indicated in the graph as approximately 200 turbine r.p.m. When the propeller underspeeds more than 200 turbine r.p.m. the pitch position of the propeller blades will be decreased at a rate directly proportional to the amount of underspeeding as indicated by the graph in Figure 4.

Referring again to Fig. 1, the construction of the solenoid valve 30 will now be described. Solenoid valve 30 includes a housing 32 having supply ports 31 and a pair of control ports 33 and 34. It should be noted that control port 33 is connected with the increase pitch chamber 51 of the fluid motor 50 in parallel with port 13 of the centrifugal governor valve 10 by means of conduit 35. Similarly, the control port 34 is connected to the decrease pitch chamber 52 in parallel with the control port 14 of the centrifugal valve 10 by means of conduit 36. Thus, it will be appreciated that the valves 10 and 30 may severally or jointly control the flow of fluid from the source 25 to the motor 50. The housing 32 also includes a pair of drain ports 38 and 39. The housing 32 has disposed therein a reciprocable plunger 37 capable of electromagnetic actuation in either direction. Thus, the plunger 37 includes rod portions which project through opposite end walls of the housing 32 and which carry armatures 40 and 41. Solenoid valve assembly 30 is also provided with mechanical stops 42 and 43, which are engageable with the ends of the plunger rods so as to limit the movement which can be imparted to the plunger 37. The plunger 37 is normally maintained in a neutral position, in the absence of electromagnetic actuation, by a pair of oppositely acting centering springs 44 and 45. The plunger 37 is also formed with a pair of lands 46 and 47, which are separated by an annular channel having communication with the supply port 31. The lands 46 and 47, in the neutral position of the plunger 37, close the ports 34 and 33, respectively. The armature 40 is disposed within a solenoid coil 48, while the armature 41 is disposed within a solenoid coil 49. Solenoid coils 48 and 49 are interconnected by a conductive lead 63 to ground. Solenoid coil 48 is also connected by conductive lead 64 to one terminal of a power stage designated by the numeral 70, while solenoid coil 49 is connected by conductive lead 65 to another terminal of the power stage 70. The power stage 70 is adapted to be actuated by an amplifier 71 as controlled by a multivibrator 72, the output of which is modified by a rate circuit 73 to which power is supplied by a rectifier 74. The specific circuitry of the amplifier, multivibrator, rate circuit and rectifier will be described hereinafter. The power stage 70 is also connected to a D.C. power supply indicated by the numeral 75.

It should be noted that the solenoid valve 30 is physically constructed so that unbalanced flows in conduits 35 and 36 are delivered to the fluid motor 50, even though the coils 48 and 49 are alternatively energized for periods of equal time duration, during each pulse cycle of energization. This may be accomplished in several ways but, as is shown schematically in Fig. 1, the port 34 is of appreciably greater area than the port 33, whereby under equal duration pulse cycling of the coils 48 and 49, the solenoid valve 30 will produce a net flow equivalent to approximately 1° per second blade angle change in a decrease pitch direction, or, in other words, towards an increase r.p.m.

With particular reference to Fig. 2, the specific circuitry of the electronic system will be described. As shown in Fig. 2, the electronic system includes a transformer T1 having a primary winding 80, which is connected to an alternator, designated by the numeral 76a in Fig. 1, which produces an alternating current signal at a voltage and frequency proportional to the angular velocity of the prime mover 62. The transformer T1 also includes a secondary winding 81, which is connected with a conventional half wave rectifier 74 including electronic tubes V1 and V2. The half wave rectifier 74 produces a pulsating D.C. voltage, and speed variations in the prime mover result in equal voltage changes of opposite senses between points A and C with respect to point B. Point B is connected by a wire 83 to a negative power supply 85, which develops a negative potential of substantially 200 volts. The negative power supply derives its voltage from a transformer T2 having a primary winding 86 connected by conductive leads to a source of 400 cycle A.C. current. The transformer T2 includes a secondary winding 87 having connection with a rectifier tube V3, the plates of which are interconnected through a resistor and condenser arrangement to the wire 83.

The half wave rectifier 74, including the tubes V1 and V2, includes a wire 88, which interconnects the cathodes of the tubes V1 and V2, the wire 88 also having connection with a filter including inductances L1 and L2 and condensers C1, C2, C3 and C4. The other side of the secondary winding 81 of the transformer T1 is connected by a wire 89 to the filter aforedescribed. Thus, at points D and E, there is a D.C. voltage proportional to the speed of the prime mover 62. The voltages developed at points D and E with respect to the point F, which it will be appreciated are proportional to the prime mover speed are developed across condensers C2 and C4. In order to obtain signals which are proportional to acceleration, or, in other words, to produce a control by the solenoid valve, which will effect a rate of blade angle change per rate of change of propeller speed in revolutions per second, differentiating rate circuits are connected between the condensers C2 and C4 and the multivibrator 72. These rate circuits are indicated generally by the numeral 73 in Fig. 2. It is to be noted that the equal potentials of opposite polarity, which appear between points D and F and between points E and F are directly proportional to speed at any instant. Therefore, a speed change will result in a like amount of voltage change between points D and F and between points E and F.

Thus, any speed change voltage developed across condenser C2 is differentiated by the RC network of R1 and C5, and the voltage developed across condenser C4 is differentiated by R2 and C6. Accordingly, there is developed across resistors R1 and R2 voltages during speed changes, which are rate signals for controlling the multivibrator pulse ratio. Inasmuch as the condensers C5 and C6 are not paralleled by resistors only the rate of speed change signals appear across R1 and R2, while the speed change signals at D and E are not developed across R1 and R2. The acceleration sensitivity control will hereinafter be designated by $K_2$ in terms of blade angle change in degrees per second per R.P.S. per second.

The multivibrator circuit 72 is of conventional design using a double element tube V4, the signal output of which is modified by the rate sensitivity voltages used as bias. The bias voltages are developed across R1 and R2, and are applied through grid resistors R3, R4, R5 and R6 to the grids of the tube V4. Hence, when no speed change signal voltages appear at points D and E, the rate circuit 73 will not develop differential voltages across resistors R1 and R2. Therefore, bias voltages are not applied to the grids of tube V4 and the pulse ratio of the multivibrator appearing in the plate circuit thereof is composed of alternate pulses of equal time duration. However, when speed change voltages appear at points D and E, they are differentiated by the rate circuit 73 and, consequently, rate of change of speed biasing voltages are developed across resistors R1 and R2, which voltages are of equal potential and opposite polarity, these voltages being applied as grid bias to the tube V4 so as to alter the pulse ratio of the multivibrator circuit. Thus, when the rate of change speed signals are applied to the grids of the tube V4, the signal appearing in the plate circuit thereof will consist of alternate pulses of unequal time duration.

Stated in other words, when no bias voltages are applied to the grids of the two tube sections, the output signal of the multivibrator is of a square and symmetrical wave form. However, if the grid bias of the two tube wave sections are equal but of opposite polarity, the conductance times of the two tube sections are unequal and the output signal wave form is unsymmetrical. The output signal of the multivibrator 72 is directly coupled to the grids of the amplifier 71, and the output of the amplifier 71 is applied to the grids of a cathode loaded power stage indicated by the numeral 70. The amplifier stage includes a dual element tube V5, whereas the power stage includes four tubes V6, V7, V8 and V9.

The power supply 75 for the power stage 70 is supplied from the transformer T2 and includes a secondary winding 87, which is connected to a full wave, selenium type full wave rectifier 90 and an RC filter 91, which is connected to the plate circuits of the tubes V6, V7, V8 and V9. The transformer T2 also includes secondary windings 182, 188 and 189, which are connected to the filaments of various tubes in the electronic system. The output of the power stage 70 is taken from the cathodes of the tubes V6, V7, V8 and V9, and is applied to conductive leads 64 and 65, which are connected to the solenoid windings 48 and 49, respectively.

When it is desired to only incorporate acceleration sensitivity, or $K_2$, in the electronic biasing system, the potentiometer P1, the center contact of which is connected to the cathodes of the tube V4 is connected by wires 93 and 94 to points $a$ and $b$, as shown in Fig. 3. Points $a$ and $b$ are connected to resistors R7 and R8 of equal ohmic value, the center point of which is connected by a wire 95 to $c$. Point $c$ is, in turn, connected to the negative power supply 85. Initially, the movable point of the potentiometer P1 is adjusted so that when there is no speed change or substantially constant speed propeller operation, the multivibrator output signal is symmetrical. That is, the alternate pulses are of equal time duration, or, putting it in other words, the pulse ratio is 50:50.

Now, having reference to Figs. 1 and 5, with the prime mover operating at 14,200 r.p.m. and recalling that when the pulse ratio of the multivibrator is 50:50 and applied to the solenoid coils 48 and 49, unbalanced flows are produced by the solenoid valve, which operate to decrease propeller pitch. As aforementioned, the unbalanced flow produced by the solenoid valve 30 when the electronic system is energized with the prime mover operating at the speed level of the centrifugally responsive governor valve 10, namely 14,200 r.p.m., result in a net flow decreasing propeller pitch at a rate of 1° per second blade angle change. When the pitch position of the propeller blades is decreased, the propeller speed will increase. As propeller speed increases, the plunger 15 of the governor valve 10 will move upwardly to an off-speed position. When the governor valve 10 is in a position corresponding to the valve position which would normally result in a pitch change rate of 1° per second towards increased pitch, the unbalanced flow of the solenoid valve 30 tending to decrease propeller pitch at 1° per second will be counteracted, or neutralized. In other words, at this time fluid flow through port 13 from port 12 will flow to drain through line 35 and port 33 at the same rate as net flow from solenoid valve 30 flows from port 31 through port 34 to drain through conduit 24 and port 14. The propeller will now be operating at a higher speed level. Since the control curve of the governor valve as indicated in Figure 4 in the overspeed range indicates that the governor valve 10 will increase propeller pitch at a rate of 1° per second when the propeller overspeeds substantially 100 turbine r.p.m., the speed level of the propeller will be changed from 14,200 turbine r.p.m. to 14,300 turbine r.p.m. when the electronic system is energized. Thus, even when there is no speed change and no acceleration signals, the electronic system will bias the fluid pressure governor into a higher sensitivity region so as to enhance the performance characteristics of the system. This increased K1 of the valve 10 tends to result in instability, or "hunting," but by reason of the electronic system being operative and providing K2, or acceleration sensitivity, the requisite stability is achieved. Thus, the governed speed of the prime mover 62 is increased when the switch 76 is closed from 14,200 r.p.m., as shown in Fig. 4, to 14,300 r.p.m. as shown in Fig. 5. Now, with the acceleration circuit in operation during speed corrections, prime mover accelerations and decelerations will alter the character of the pulse cycle energization of the solenoid valve from alternate pulses of equal time duration to alternate pulses of unequal time duration, in either sense, whereupon biasing fluid flow will be supplied to the fluid motor in addition to the flow supplied by the governor valve 10, which biasing flow will dampen speed oscillations.

When the electronic system is operating, the sensitivity of the centrifugally responsive valve 10 is increased. In other words, as shown in Figure 5 if the propeller should underspeed, the plunger 15 will move downwardly thereby tending to close port 13 to the pressure supply port 12 and likewise closing port 14 to drain. Since the solenoid valve is controlled by an electronic system which is not speed responsive, but only acceleration, or acceleration and synchronization response, the unbalanced flow of the solenoid valve will result in a decrease pitch movement of the propeller blades so as to correct for propeller underspeeding. Accordingly, whereas the centrifugally responsive governor valve 10, by itself, has a no response range, as indicated in Figure 4, until the propeller underspeed exceeds approximately 200 turbine r.p.m., when the electronic system is operating the centrifugally responsive governor valve 10 will be operative to control propeller pitch whenever propeller speed deviates from the speed level of 14,300 r.p.m. While it is true that the pitch change rate in the decrease pitch direction does not increase above 1° per second until the propeller underspeeds more than 300 r.p.m., as indicated by the flat part of the curve in Figure 5, nevertheless, the system is more sensitive when the solenoid valve is operating than when only the centrifugally responsive governor valve is operating. This operational effect on the control curve of the centrifugally responsive governor valve may be referred to as biasing the fluid pressure governor.

When it is desired to also incorporate means for synchronizing the speeds of several prime movers with each other, or with a reference speed source, a second potentiometer P2 is connected across the points $a$, $b$ and $c$, as shown in Fig. 2. The movable contact of the potentiometer P2 is controlled by reversible electric motor 96, which is connected by wires 97, 98, 99 and 100 to the output of an electronic synchronizing device, which may be of the type disclosed and claimed in Patent No. 2,673,309, owned by the assignee of this invention. This type of synchronizer produces signals by comparing the speeds of a prime mover with either another prime mover or a reference speed source, and when a speed difference between the two exists, electric motor 96 is actuated to unbalance the bridge circuit formed by potentiometers P1 and P2 to thereby modify the pulse ratio of the multivibrator 72 independently of the rate circuits 73. The biasing action of the synchronizing motor 96 as it controls the potentiometer P2 merely adjusts the multivibrator pulse output at a relatively low rate so that the propeller speed is maintained in synchronism with the reference speed source.

Now, having reference to Fig. 6, it may be seen that the synchronizing circuit, namely the potentiometer P2, may modify the control effected by the centrifugal governor valve 10 so that the sensitivity thereof follows the lines RSTU or RVXU. These two lines represent the maximum biasing action of the combined acceleration and synchronization circuits, with the line RSTU depicting the flow rate of the system with the synchronizer set for maximum increased pitch correction, or, in other words, maximum decrease r.p.m. correction. The curve RVXU depicts the system sensitivity when the synchronizer is set for a maximum decrease pitch correction, or stated in other words, maximum increase r.p.m. correction.

From the foregoing, it is manifest that the present invention provides a speed control system wherein reliable and stable speed control may be effected merely by using a centrifugally responsive governor. Moreover, the centrifugal speed control system may be biased by acceleration sensitivity or acceleration and synchronization control. However, while the most desirable control is achieved by use of the acceleration sensitive circuit alone or in combination with synchronization control, speed stability may be effected by the centrifugal governor valve alone in the event of an electronic failure.

While the embodiment of the present invention as herein disclosed, constitutes a preferred form, it is to be understood that other forms might be adopted.

What is claimed is as follows:

1. Speed control means for a prime mover driven propeller having pitch adjustable blades, including in combination, a fluid pressure system for adjusting the pitch position of said blades including, a source of fluid pressure, a centrifugally responsive governor valve rotatable with the propeller having a control curve with a no response range, a fluid motor for adjusting the pitch position of said blades, and a fluid circuit interconnecting said source, said valve and said motor, said valve being in an on-speed equilibrium position at a predetermined rotative speed of said propeller so as to control the application of fluid pressure to said motor to alter the pitch position of said blades when propeller speed deviates from said predetermined speed, said on-speed equilibrium position of said governor valve being at one end of said no response range an electrically operable valve connected between said fluid motor and said source in parallel with said centrifugally responsive valve for applying unbalanced fluid flow to said motor when said centrifugally responsive valve is in an on-speed position so as to adjust the pitch of said blades and increase the rotative speed of the propeller, said governor valve being responsive to the increase in the rotative speed of said propeller so as to be moved to an off-speed position away from said one end of the no response range whereat the unbalanced flow of said electrically operable valve is counteracted by fluid flow from said governor valve to establish a speed level for said propeller higher than said predetermined rotative speed, and a control organization connected to said electrically operable valve and operable to actuate said electrically operable valve, said control organization including pulse producing means having an output comprising, alternate electrical impulses for actuating said valve, equal during constant speed propeller operation and unequal during changes in propeller speed to provide acceleration sensitivity so as to stabilize propeller operation during speed changes.

2. Speed control means for a prime mover driven propeller having pitch adjustable blades, including in combination, a fluid pressure system for adjusting the pitch position of said blades including, a source of fluid pressure, a centrifugally responsive governor valve rotatable with the propeller having a control curve with a no response range, a fluid motor for adjusting the pitch position of said blades, and a fluid circuit interconnecting said source, said valve and said motor, said valve being in an on-speed equilibrium position at a predetermined rotative speed of said propeller so as to control the application of fluid pressure to said motor to alter the pitch position of said blades when propeller speed deviates from said predetermined speed, said on-speed equilibrium position of said governor valve being at one end of said no response range an electrically operable valve connected between said fluid motor and said source in parallel with said centrifugally responsive valve for applying unbalanced fluid flow to said motor when said centrifugally responsive valve is in an on-speed position so as to adjust the pitch of said blades and increase the rotative speed of the propeller, said governor valve being responsive to the increase in the rotative speed of said propeller so as to be moved to an off-speed position away from said one end of the no response range whereat the unbalanced flow of said electrically operable valve is counteracted by fluid flow from said governor valve to establish a speed level for said propeller higher than said predetermined rotative speed, a control organization connected to said electrically operable valve and operable to actuate the electrically operable valve, said control organization including pulse producing means having an output comprising, alternate electrical impulses for actuating said electrically operable valve, equal during constant speed operation of the propeller and unequal during changes in propeller speed, an alternator driven by said propeller for generating alternating current having a frequency proportional to propeller speed, and means for differentiating said alternating current and applying the same to the input of the pulse producing means for controlling the output thereof in accordance with speed changes of the propeller to provide acceleration sensitivity.

3. The combination set forth in claim 2 wherein said last recited means comprises a rectifier connected to said alternator and producing a D.C. voltage proportional to the speed changes of said propeller.

4. The combination set forth in claim 3 wherein said D.C. voltage proportional to speed changes is differentiated by rate circuits and applied to the input of the pulse producing means for controlling the output thereof.

5. Speed control means for a prime mover driven propeller having pitch adjustable blades, including in combination, a fluid pressure system for adjusting the pitch position of said blades including, a source of fluid pressure, a centrifugally responsive governor valve rotatable with the propeller having a control curve with a no response range, a fluid motor for adjusting the pitch position of said blades, and a fluid circuit interconnecting said source, said valve and said motor, said valve being in an on-speed equilibrium position at a predetermined rotative speed of said propeller so as to control the application of fluid pressure to said motor to alter the pitch position of said blades when propeller speed deviates from said predetermined speed, said on-speed equilibrium position of said governor valve being at one end of said no response range an electrically operable valve connected between said fluid motor and said source in parallel with said centrifugally responsive valve for applying unbalanced fluid flow to said motor when said centrifugally responsive valve is in an on-speed position so as to adjust the pitch of said blades and increase the rotative speed of the propeller, said governor valve being responsive to the increase in the rotative speed of said propeller so as to be moved to an off-speed position away from said one end of the no response range whereat the unbalanced flow of said electrically operable valve is counteracted by fluid flow from said governor valve to establish a speed level for said propeller higher than said predetermined rotative speed, and a control organization connected to said electrically operable valve and operable to actuate said electrically operable valve, said control organization including pulse producing means having an output comprising, alternate electrical impulses for actuating said electrical operable valve, equal during constant speed operation of said propeller and unequal during changes in propeller speed, and means connected to the input of said pulse producing means and operable to control the output thereof in response to deviations of the propeller speed from a reference speed source so as to provide synchronization control.

6. The combination set forth in claim 5 wherein the last recited means comprises a bridge circuit including a potentiometer, the movable contact of which is automatically adjusted in accordance with speed deviations of the propeller from said reference speed source.

7. Speed control means for a prime mover driven propeller having pitch adjustable blades, including in combination, a fluid pressure system for adjusting the pitch position of said blades including, a source of fluid pressure, a centrifugally responsive governor valve rotatable with the propeller having a control curve with a no response range, a fluid motor for adjusting the pitch position of said blades, and a fluid circuit interconnecting said source, said valve and said motor, said valve being in an on-speed equilibrium position at a predetermined rotative speed of said propeller so as to control the application of fluid pressure to said motor to alter the pitch position of said blades when propeller speed deviates from said predetermined speed, said on-speed equilibrium position of said governor valve being at one end of said no response range an electrically operable valve connected between said fluid motor and said source in parallel with said centrifugally responsive valve for applying unbalanced fluid flow to said motor when said centrifugally responsive valve is in an on-speed position so as to adjust the pitch of said blades and increase the rotative speed of the propeller, said governor valve being responsive to the increase in the rotative speed of said propeller so as to be moved to an off-speed position away from said one end of the no response range whereat the unbalanced flow of said electrically operable valve is counteracted by fluid flow from said governor valve to establish a speed level for said propeller higher than said predetermined rotative speed, a control organization connected to said electrically operable valve and operable to actuate the electrically operable valve, said control organization including pulse producing means having an output comprising, alternate electrical impulses for actuating said electrically operable valve, equal during constant speed operation of said propeller and unequal during changes in propeller speed, an alternator driven by said propeller and producing an alternating current having a frequency proportional to the propeller speed, differentiating means connected with said alternating current signal and with the input of said pulse producing means for controlling the output thereof in accordance with speed changes of said propeller, and synchronizing means connected to the input of said pulse producing means and operable to control the output thereof in response to deviations of the propeller speed from a reference speed source, the output of said pulse producing means being capable of variation either severally or jointly by said differentiating and synchronizing means whereby the operation of said centrifugally responsive valve is modified with acceleration and synchronization sensitivity.

8. The combination set forth in claim 7 wherein said control organization includes a rectifier having connection with said alternator for producing a D.C. voltage proportional to speed changes.

9. The combination set forth in claim 8 wherein said differentiating means includes rate circuits having connection with said D.C. voltage for producing input signals to the pulse producing means in response to propeller speed changes.

10. The combination set forth in claim 7 wherein the synchronizing means comprises a bridge circuit including a potentiometer, the movable contact of which is automatically adjusted in accordance with speed deviations of the propeller from said reference speed source.

11. The combination with a variable pitch propeller having pitch adjustable blades, and a fluid pressure system for automatically varying the pitch of said blades so as to maintain propeller speed substantially constant at a predetermined value, said fluid pressure system comprising a source of fluid pressure, a centrifugally responsive governor valve rotatable with the propeller having a control curve with a no response range, a fluid motor for varying the pitch position of said blades, and a fluid circuit interconnecting said source, said valve and said motor whereby said valve is in an on-speed equilibrium position at said predetermined constant speed whereby deviations in propeller speed from the said predetermined speed results in variation in the pitch position of said blades, said on-speed equilibrium position of said governor valve being at one end of said no response range; of a solenoid valve connected between said source and said fluid motor in parallel with said governor valve, and means connected to said solenoid valve to effect energization of said solenoid valve so as to apply unbalanced fluid flow to said motor when said governor valve is in the on-speed equilibrium position to adjust the pitch position of said blades and increase the rotative speed of said propeller, said governor valve being responsive to the increase in the rotative speed of said propeller so as to be moved to an off-speed position away from said one end of the no response range whereat the unbalanced flow of the solenoid valve is counteracted by fluid flow from said governor valve to establish a speed level for said propeller higher than said predetermined constant speed.

12. The combination with a variable pitch propeller having pitch adjustable blades, and a fluid pressure system for automatically varying the pitch of said blades so as to maintain propeller speed substantially constant at a predetermined value, said fluid pressure system comprising a source of fluid pressure, a centrifugally responsive governor valve rotatable with the propeller having a control curve with a no response range, a fluid motor for varying the pitch position of said blades, and a fluid circuit interconnecting said source, said valve and said motor whereby said valve is in an on-speed equilibrium position at said predetermined constant speed whereby deviations in propeller speed from the said predetermined speed results in variation in the pitch position of said blades, said on-speed equilibrium position of said governor valve being at one end of said no response range; of a solenoid valve connected between said source and said fluid motor in parallel with said governor valve for applying unbalanced fluid flow to said motor when said centrifugally responsive valve is in an on-speed position to adjust the pitch position of said blades so as to increase the rotative speed of said propeller, said governor valve being responsive to the increase in the rotative speed of said propeller so as to be moved to an off-speed position away from said one end of the no response range whereat the unbalanced flow of the solenoid valve is counteracted by fluid flow from said governor valve to establish a speed level for said propeller higher than said predetermined constant speed and means connected to said solenoid valve and operable to energize said solenoid valve, said means including pulse producing means having an output comprising, alternate electrical inpulses for actuating said solenoid valve, equal during constant speed propeller operation and unequal during changes in propeller speed, whereby the fluid pressure governing system is modified by acceleration sensitivity.

13. The combination set forth in claim 12 wherein the pulse producing means comprises a multivibrator, and wherein the means for actuating the solenoid valve include an alternator driven by the propeller and producing an alternating current signal having a frequency proportional to propeller speed.

14. The combination set forth in claim 13 wherein the means operable to actuate said solenoid valve includes a rectifier having connection with said alternating current signal for producing a D.C. voltage proportional to propeller speed changes, and differentiating means connected with said D.C. voltage and with the input of said multivibrator for controlling the output thereof in accordance with speed changes of said propeller.

15. The combination with a variable pitch propeller having pitch adjustable blades, and a fluid pressure system for automatically varying the pitch of said blades so as to maintain propeller speed substantially constant at a predetermined value, said fluid pressure system comprising a source of fluid pressure, a centrifugally responsive governor valve rotatable with the propeller having a control curve with a no response range, a fluid motor for varying the pitch position of said blades, and a fluid circuit interconnecting said source, said valve and said motor whereby said valve is in an on-speed equilibrium position at said predetermined constant speed whereby deviations in propeller speed from the said predetermined speed results in variation in the pitch position of said blades, said on-speed equilibrium position of said governor valve being at one end of said no response range; of a solenoid valve connected between said source and said fluid motor in parallel with said governor valve for applying unbalanced fluid flow to said motor when said centrifugally responsive valve is in an on-speed position to adjust the pitch position of said blades so as to increase the rotative speed of said propeller, said governor valve being responsive to the increase in the rotative speed of said propeller so as to be moved to an off-speed position away from said one end of the no response range whereat the unbalanced flow of the solenoid valve is counteracted by fluid flow from said governor valve to establish a speed level for said propeller higher than said predetermined constant speed means connected to said solenoid valve and operable to actuate said solenoid valve, said means including pulse producing means having an output comprising, alternate electrical impulses for actuating said solenoid valve, and synchronizing means for varying the output of said pulse producing means in accordance with deviations of the propeller speed from a reference speed source.

16. The combination set forth in claim 15 wherein the pulse producing means comprises a multivibrator and wherein said synchronizing means comprises a bridge circuit including a potentiometer, the movable contact of which is automatically positioned to vary the input to said multivibrator so as to vary the output thereof in accordance with deviations in propeller speed from said reference speed source.

17. The combination with a variable pitch propeller having pitch adjustable blades, and a fluid pressure system for automatically varying the pitch of said blades so as to maintain propeller speed substantially constant at a predetermined value, said fluid pressure system comprising a source of fluid pressure, a centrifugally responsive governor valve rotatable with the propeller having a control curve with a no response range, a fluid motor for varying the pitch position of said blades, and a fluid circuit interconnecting said source, said valve and said motor whereby said valve is in an on-speed equilibrium position at said predetermined constant speed whereby deviations in propeller speed from the said predetermined speed results in variation in the pitch position of said blades, said on-speed equilibrium position of said governor valve being at one end of said no response range; of a solenoid valve connected between said source and said fluid motor in parallel with said governor valve for applying unbalanced fluid flow to said motor when said centrifugally responsive valve is in an on-speed position to adjust the pitch position of said blades so as to increase the rotative speed of said propeller, said governor valve being responsive to the increase in the rotative speed of said propeller so as to be moved to an off-speed position away from said one end of the no response range whereat the unbalanced flow of the solenoid valve is counteracted by fluid flow from said governor valve to establish a speed level for said propeller higher than said predetermined constant speed and means connected to said solenoid valve and operable to actuate said solenoid valve, said means including a multivibrator having an output comprising, alternate electrical impulses for actuating said solenoid valve, an alternator driven by said propeller and producing an A.C. signal having a frequency proportional to propeller speed, differentiating means connected to said A.C. signal and with the input of said multivibrator for varying the output thereof in accordance with speed changes of the propeller, and synchronizing means having connection with the input of the multivibrator for varying the output thereof in accordance with deviations in propeller speed from that of a reference speed source, whereby the output of said multivibrator may be controlled severally and jointly by the differentiating and synchronizing means so that the operation of said governor valve is modified with acceleration and synchronization sensitivity system.

18. A speed control system having a prime mover driven propeller having adjustable pitch blades, including in combination, a source of fluid pressure, a fluid motor connected to said blades for adjusting the pitch position thereof, a centrifugally responsive governor valve rotatable with said propeller and connected to said source and said motor for controlling the application of fluid pressure to said motor to adjust the pitch position of said blades, said governor valve having a control curve with a no response range and having a predetermined speed setting so as to be in an on-speed equilibrium position at said predetermined speed setting, the on-speed equilibrium position of said valve being at one end of said no response range an electrically operable valve connected between said source and said motor in parallel with said governor valve, an alternator driven by said propeller for generating an alternating current signal at a frequency proportional to propeller speed, electrical means having an output connected to said electrically operable valve for energizing said valve when the propeller is rotating at the speed setting of said governor valve to apply unbalanced fluid flow to said motor independently of said governor valve and adjusting the pitch position of said blades to establish a propeller speed higher than the predetermined speed setting of said governor valve, said governor valve being responsive to the increase in the rotative speed of said propeller so as to be moved to an off-speed position away from said one end of the no response range whereat the unbalanced flow of said electrically operable valve is counteracted by fluid flow from said governor valve to establish a speed level for said propeller higher than said predetermined speed setting; and means applying said alternating current signal to the input of said electrical means for controlling the output thereof.

19. A speed control system having a prime mover driven propeller having adjustable pitch blades, including in combination, a source of fluid pressure, a fluid motor connected to said blades for adjusting the pitch position thereof, a centrifugally responsive governor valve rotatable with said propeller and connected to said source and said motor for controlling the application of fluid pressure to said motor to adjust the pitch position of said blades, said governor valve having a control curve with a no response range and having a predetermined speed setting so as to be in an on-speed equilibrium position at said predetermined speed setting, the on-speed equilibrium position of said valve being at one end of said no response range a reciprocable solenoid operated valve connected between said source and said motor in parallel with said governor valve, and an alternator driven by said propeller for generating an alternating current signal at a frequency proportional to propeller speed, electrical means having an output comprising alternate electrical impulses connected to said solenoid valve for energizing the solenoid valve when said propeller is rotating at said predetermined speed setting of the governor valve for applying unbalanced fluid flow to said motor to decrease the pitch position of said blades and increase the rotative speed of said propeller, said governor valve being responsive to the increase in the rotative speed of said propeller so as to be moved to an off-speed position away from said one end of the no response range whereat the unbalanced flow of said solenoid operated valve is counteracted by fluid flow from said governor valve to establish a speed level for said propeller higher than said predetermined speed setting, and differentiating means connected to said alternating current signal and having an output connected to the input of said electrical means for controlling the output thereof.

References Cited in the file of this patent

UNITED STATES PATENTS

| | | |
|---|---|---|
| 2,246,516 | Herzog | June 24, 1941 |
| 2,390,084 | Edwards | Dec. 4, 1945 |
| 2,517,703 | Offner | Aug. 8, 1950 |
| 2,551,306 | Wisman | May 1, 1951 |
| 2,573,368 | Seborg | Oct. 30, 1951 |
| 2,619,183 | Chillson et al. | Nov. 25, 1952 |
| 2,620,883 | Quinn | Dec. 9, 1952 |
| 2,669,312 | Dinsmore et al. | Feb. 16, 1954 |